United States Patent [19]

Schneider

[11] Patent Number: 4,727,765
[45] Date of Patent: Mar. 1, 1988

[54] SHIFT MECHANISM FOR MANUAL TRANSMISSION

[75] Inventor: Josef Schneider, Wesseling-Berzdorf, Fed. Rep. of Germany

[73] Assignee: Ford Motor Company, Dearborn, Mich.

[21] Appl. No.: 944,902

[22] Filed: Dec. 22, 1986

[30] Foreign Application Priority Data

Jan. 24, 1986 [DE] Fed. Rep. of Germany ....... 3602157

[51] Int. Cl.$^4$ .......................... G05G 5/10; G05G 9/12
[52] U.S. Cl. ........................................... 74/477; 74/475
[58] Field of Search ...................... 74/473 R, 475, 477

[56] References Cited

U.S. PATENT DOCUMENTS

| | | | |
|---|---|---|---|
| 4,297,910 | 11/1981 | Myers | 74/473 R |
| 4,472,868 | 9/1984 | Takahashi | 74/477 X |
| 4,539,859 | 9/1985 | Arai et al. | 74/477 X |
| 4,569,247 | 2/1986 | Inui et al. | 74/477 X |
| 4,633,728 | 1/1987 | May | 74/476 |

FOREIGN PATENT DOCUMENTS

| | | |
|---|---|---|
| 1680046 | 4/1972 | Fed. Rep. of Germany . |
| 3003076 | 7/1980 | Fed. Rep. of Germany . |
| 3228790 | 3/1983 | Fed. Rep. of Germany . |
| 3245529 | 6/1984 | Fed. Rep. of Germany . |
| 132819 | 8/1983 | Japan ................................... 74/477 |

*Primary Examiner*—Allan D. Herrmann
*Attorney, Agent, or Firm*—Frank G. McKenzie; Donald J. Harrington

[57] ABSTRACT

A gearshift mechanism for a multiple speed manual transmission includes a selector shaft, which is rotatable for preselecting gearshift planes and axially displaceable for engaging the selected gear; a selector finger fixed to the selector shaft selectively engageable with grooves on gearshift forks guided on the selector shaft; a check plate surrounding the selector finger and selector shaft pivotably mounted but axially fixed to prevent movement of the unselected gearshift fork; and a spring-loaded detent for engaging recesses formed at the hub of the selector finger.

6 Claims, 5 Drawing Figures

SHIFT MECHANISM FOR MANUAL TRANSMISSION

BACKGROUND OF THE INVENTION

1. Field of the Invention

This invention relates to the field of gearshift mechanisms for manual transmissions and, more particularly, pertains to the portion of such a mechanism located in the vicinity of the selector finger and check plate.

2. Description of the Prior Art

German patent No. 30 03 076 describes a shift mechanism that includes a selector finger secured to the selector shaft by a hub, which is surrounded by the hub of a check plate guided on the selector shaft. This mechanism does not include a spring-loaded catch device or detent for holding the selector shaft in several axial positions with respect to the transmission casing or any other reference position. Conventional gearshift mechanisms that include detents locate the detent in a bore on the transmission casing.

The arrangement of such a gearshift catch device located separate from the gearshift and locking mechanism has the disadvantage that the accumulation of dimensional tolerances, which arise during manufacturing and assembly, cause substantial discrepencies between the gearshift positions determined by the spring-loaded catch mechanism and the actual gearshift positions of the gearshift members.

The gearshift mechanism described in German Patent No. 32 45 529 includes a selector shaft displaceable axially for preselecting gearshift channels or planes and rotatable angularly for engaging the gear speeds. In this shift mechanism, to avoid tolerance problems, the spring-loaded catch device is located between a pivotal selector finger and the check plate, whose position is fixed to prevent pivoting. The spring-loaded catch includes a helical compression spring, which surrounds the selector shaft and acts on a locking ring. The ring receives a ball mounted rotatably and cooperating with corresponding catch recesses in the check plate.

The gearshift apparatus of German Published Specification No. 16 80 046 includes a selector shaft, axial displaceable for preselecting gearshift channels and radially pivotable for engaging the selected gear speed. To simplify assembly in this mechanism, a spring-loaded catch device is located between a rotatably pivotal selector finger and a radially fixed check plate. The selector finger is provided with a cylindrical extension for receiving a spring-loaded ball catch, Which cooperates with corresponding recesses in a member connected to the check plate. The catch recesses extend over the axial path of the selector shaft, which is required for the preselection of the gearshift channel. The structural complexity is relatively substantial and the number of components of this mechanism is large.

SUMMARY OF THE INVENTION

An object of this invention is to provide a manual transmission gearshift mechanism which minimizes the accumulation of dimensional tolerances that results due to manufacturing and assembly. These tolerances adversely affect the operation of the mechanism to such an extent that the position of the gearshift lever and the position of the selector shaft is inaccurate. Furthermore, the mechanism according to the present invention limits the axial displacement of the selector shaft and uses a minimum number of components that are easily manufactured and assembled.

The mechanism of this invention includes the selector finger formed with a hub carried on the selector shaft and a check plate formed with a hub that surrounds the hub of the selector finger. A cylindrical extension is formed integrally with the check plate hub and is adapted to receive within the cylinder a spring-loaded ball detent. The hub of the selector finger is formed with recesses engageable by the ball of the detent. This arrangement locates the components so that dimensional tolerances are minimized, and the assembly is so compact that difficulties, which usually arise from the accumulation of tolerances in mechanisms using a greater number of components, are avoided.

In the gearshift mechanism of this invention, an axial slot is provided in the hub of the selector finger and the shank of a bolt extends through the transmission casing into the slot. In this way the travel of the selector finger relative to the bolt is limited by contact with the axial edges of the slot. Located radially outward of the slot is a locking slot formed in the hub of the check plate. The locking slot extends angularly about the axis of a selector shaft and the shank of the bolt extends through the locking slot into the slot in the hub of the selector finger. Contact between the bolt and the axial edges of the locking slot prevent movement of the check plate relative to the selector shaft. Contact between the bolt and the radial edges of the locking slot and of the selector finger slot limit angular rotation of the selector finger and check plate about the axis of the selector shaft.

Alternatively, the slot formed in the hub of the selector finger may be in the form of a gate plate having parallel interconnected axially directed slots that limit the range of axial motion of the selector shaft and shift lever and define permissible path of travel among the various shift planes through which the selector lever is moved by the vehicle operator.

BRIEF DESCRIPTION OF THE DRAWINGS

The invention is exPlained in greater detail with reference to the embodiment illustrated in the drawings, in which.

DESCRIPTION OF THE PREFERRED EMBODIMENT

Figure 1:
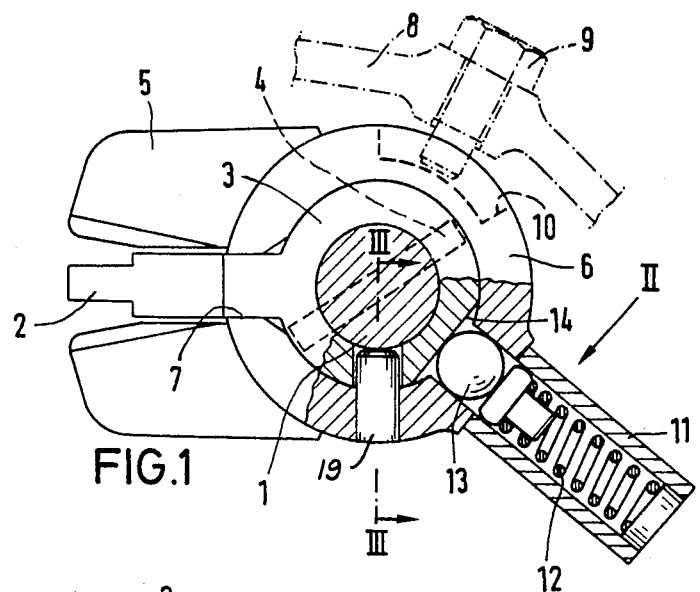
FIG. 1 is a side view partially in cross section through a plane perpendicular to the axis of the selector shaft showing the locking apparatus and spring-loaded catch according to this invention.

Referring first to FIG. 1, the hub 3 of the gearshift finger 2 is fixed by a locking pin 4 to a selector shaft 1, which is connected to the gearshift lever. A check plate 5 is formed with a hub 6 which surrounds the hub 3 of the gearshift finger 2. Hub 6 is formed with an axial slot 7, which permits axial relative movement of the gearshift finger with respect to the check plate. A bolt 9 threaded in the wall of the transmission case 8 projects into a groove 10 formed in hub 6 of the check plate 5, thereby fixing the check plate against axial displacement along the axis of the selector shaft yet permitting angular displacement of the check plate because hub 6 can rotate about the axis with the selector shaft in each direction until the shank of bolt 9 contacts a lateral face of groove 10.

Extending radially outward from selector shaft 1 and formed integrally with hub 6 is a cylindrical extension 11 having a radially directed bore extending along its length. Located within the bore of extension 11 is a helical spring 12 and a ball 13, which is biased by the force of the spring radially inward into contact with catch recesses 14, 15, 16 formed on the adjacent outer surface of hub 3 on the selector finger. When ball 13 is seated within catch recess 14, the selector finger and selection shaft are in the neutral position; catch recesses 15 and 16 define the gear ratio positions to which forward and rearward movement of the gearshift lever by the vehicle operator produces axial displacement of the selector shaft.

Figure 3:
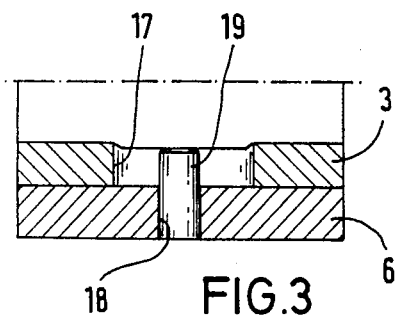
FIG. 3 is a cross section taken at plane III—III in FIG. 1.

In addition to the spring-loaded catch device, which defines the gear shift positions, FIG. 3 shows means for restricting the extent to which the selector shaft is moved axially by operation of the gearshift lever by the vehicle operator. The hub 3 of the shift finger 2 is formed with an axial slot 17, and the hub 6 of the check plate 5 is formed with a bore 18. A pin 19 is pressed into bore 18 and extends into slot 17. In this way, the range of axial displacement of the selector shaft and gearshift finger, to which the shaft is attached, is limited by the distance between the axial ends of slot 17, which come in contact with the surface of pin 19.

Figure 2:
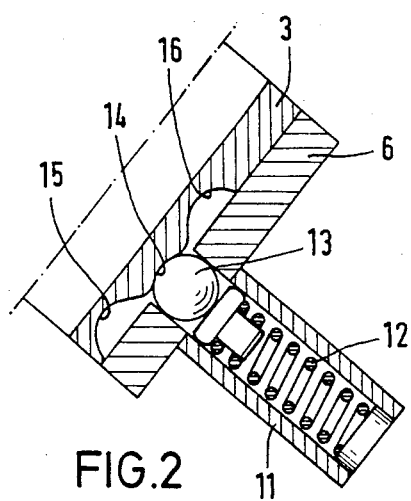
FIG. 2 is a cross section taken at a plane through the axis of the selector shaft and the locking apparatus looking in the direction II in FIG. 1.
Figure 4:
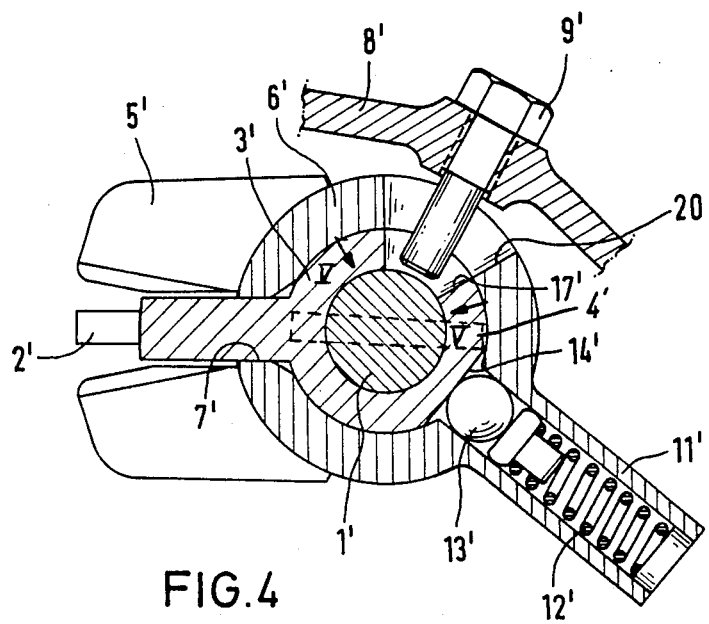
FIG. 4 is an end view partially in cross section through a plane perpendicular to the selector shaft showing a second embodiment of the invention.

The identifying numbers of a second embodiment of the invention illustrated in FIG. 4, are marked with a prime (') for the same parts illustrated in FIGS. 1, 2 and 3. In FIG. 4, hub 3' of the gearshift finger is formed with a recess 17' having a dimension that extends angularly about the axis of the selector shaft 1' to permit lateral movement of the gearshift lever and rotation of the selector shaft 1' to each of the gear shift planes to which the gearshift lever is moved during the process of selecting the various gear ratios of the transmission. Slot 17' extends axially parallel to the axis of selector shaft 1' a distance that corresponds to the distance through which the gearshift lever is moved within each of the gearshift planes to the selected gear ratios position. The locking slot is formed in the hub 6' of the check plate has a dimension in the circumferential direction corresponding to the angle through which the selector shaft 1' is rotated among the various gearshift planes to the gearshift lever is moved laterally by the vehicle operator. A locking bolt 9' is threaded into the transmission casing 8' and extends radially toward selector shaft 1' through the locking slot 20 and into slot 17'.

When the selector shaft 1' is rotated by lateral movement of the gearshift lever, check plate 5' is rotated by the contact between adjacent surfaces of selector finger 2' and the check plate. However, the check plate is prevented from moving axially as the selector shaft is moved because locking bolt 9' contacts the axial sides of locking slot 20. Axial movement of the selector shaft 1' with the gearshift finger 2' is Possible because slot 17' has an axial dimension greater than the diameter of the shank of bolt 9' and corresponding to the distance through which the selector finger moves from the neutral position in each axial direction to engage the selected gear.

Figure 5:
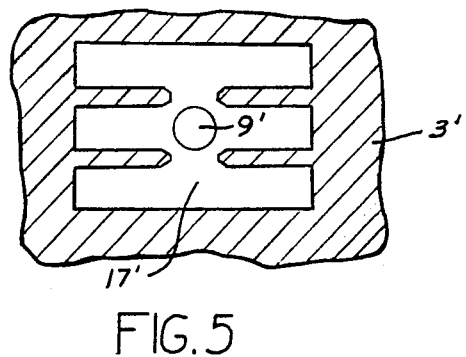
FIG. 5 is a cross section taken at plane V—V of FIG. 4 and rotated ninety-degrees.

FIG. 5 shows that slot 17' can be formed to define angularly spaced axial extending slots, each slot corresponding to a plane in which the gear shift lever is moved between two gear positions in the plane. The axial dimension of each plane of slot 17' corresponds to the distance the selector shaft 1' is moved by the gearshift lever to engage the selected gear ratio. As selector shaft 1' is rotated about its axis by lateral movement of the gearshift selector lever, the shank portion of bolt 9' becomes located among the axially extending slots corresponding to the various shift planes. In this configuration, a hub 3' of the selector finger forms a gearshift slotted gate that limits the rotation and axial displacement of the selector shaft and defines the path through which the selector shaft and gearshift lever can be moved among the various gear ratio positions.

Having described the preferred embodiments of my invention, what I claim and desire to secure by U.S. Letters Patents is:

1. A gear shift mechanism for engaging the various gears of a multiple speed ratio manually operated transmission comprising:
   a selector shaft rotatable for selecting gear shift planes and axially displaceable for engaging a selected gear in the selected gear shift plane;
   a selector finger fixed by a hub to the selector shaft, extending radially from the selector shaft, having detent recesses spaced along the axis of the selector shaft corresponding to a neutral position within a gear shift plane and the gear engagement positions within the gear shift plane;
   a check plate rotatably mounted on the selector shaft and fixed against axial displacement, located for contact with the selector finger as the selector shaft rotates, having a hub surrounding the hub of the selector finger;
   detent means for resiliently, releasably engaging the detent recesses 2. The mechanism of claim 1 further including means for fixing the selector finger to the check plate for rotation therewith, and permitting a predetermined range of axial displacement of the selector finger relative to the check plate.

3. The mechanism of claim 1 wherein the hub of the selector finger has a slot extending a predetermined axial distance, and further comprising a pin pressed into the hub of the check plate and extending into the slot of the selector finger.

4. The mechanism of claim 1 wherein the hub of the check plate has a locking slot extending a predetermined angular distance about the axis of the selector shaft, and the selector finger has a slot extending substantially the predetermined angular distance about the axis of the selector shaft, extending along the axis of the selector shaft and aligned radially with the slot of the check plate, and further including a locking pin extending radially through the locking slot and into the slot of the selector finger.

5. The mechanism of claim 4 wherein the locking pin is a portion of a bolt threaded through the transmission casing and extending into the casing.

6. The mechanism of claim 4 wherein the slot of the selector finger defines angularly spaced axially extending slots.

* * * * *